United States Patent
Qi et al.

(10) Patent No.: US 12,073,027 B2
(45) Date of Patent: Aug. 27, 2024

(54) BEHAVIOR-BASED STANDARD OPERATING PROCEDURE DETECTION

(71) Applicant: Accenture Global Solutions Limited, Dublin (IE)

(72) Inventors: Keyu Qi, Dongguan (CN); Hailing Zhou, Shenzhen (CN); Nan Ke, Xiamen (CN); David Nguyen, Newark, CA (US); Binghao Tang, Shenzhen (CN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 64 days.

(21) Appl. No.: 18/084,885

(22) Filed: Dec. 20, 2022

(65) Prior Publication Data
US 2024/0201789 A1    Jun. 20, 2024

(51) Int. Cl.
| | |
|---|---|
| *G06F 3/01* | (2006.01) |
| *G06V 10/74* | (2022.01) |
| *G06V 10/82* | (2022.01) |
| *G06V 20/52* | (2022.01) |

(52) U.S. Cl.
CPC ............ *G06F 3/017* (2013.01); *G06V 10/761* (2022.01); *G06V 10/82* (2022.01); *G06V 20/52* (2022.01)

(58) Field of Classification Search
CPC ...... G06F 3/017; G06V 20/52; G06V 10/761; G06V 10/82
USPC .......................................................... 348/77
See application file for complete search history.

(56) References Cited

U.S. PATENT DOCUMENTS

| | | | |
|---|---|---|---|
| 2008/0163130 A1* | 7/2008 | Westerman ......... | G06F 3/04883 715/863 |
| 2019/0354194 A1* | 11/2019 | Wang ..................... | G06V 10/82 |
| 2021/0089125 A1* | 3/2021 | Yuan ....................... | G10L 15/22 |
| 2021/0247846 A1* | 8/2021 | Shriram ................ | G06T 19/006 |
| 2022/0147151 A1* | 5/2022 | Hong ..................... | G06V 40/28 |
| 2022/0258606 A1* | 8/2022 | Kassner ................ | G06F 3/0482 |
| 2022/0300941 A1* | 9/2022 | Compton .............. | H04W 12/68 |
| 2022/0375268 A1* | 11/2022 | Sonoda .................. | G06V 40/28 |
| 2023/0101696 A1* | 3/2023 | Banerjee ................ | G06V 40/28 434/112 |
| 2023/0315209 A1* | 10/2023 | Rao ........................ | G06V 40/28 382/103 |

OTHER PUBLICATIONS

Ma et al., "Human Motion Gesture Recognition Based on Computer Vision," Complexity, Feb. 10, 2021, 2021:6679746, 11 pages.

* cited by examiner

*Primary Examiner* — Matthew David Kim
(74) *Attorney, Agent, or Firm* — Polsinelli P.C.

(57) ABSTRACT

Implementations are directed to receiving a first set of images included in a first video captured by a camera that monitors a human performing a task; processing the first set of images using a first machine learning (ML) model to determine whether the first set of images depicts a gesture that is included in a predefined set of gestures; in response to determining that the first set of images depicts a gesture included in a predefined set of gestures, processing a second set of images included in the first video using a second ML model to determine a first gesture type of the gesture; comparing the first gesture type with a first expected gesture type to determine whether performance of the task conforms to a standard operating procedure (SOP) for the task; and providing feedback representative of a comparison result in a user interface.

18 Claims, 5 Drawing Sheets

BEHAVIOR-BASED STANDARD OPERATING PROCEDURE DETECTION

BACKGROUND

A standard operating procedure (SOP) is a set of step-by-step instructions compiled by an organization to help workers carry out routine operations. SOPs aim to achieve efficiency, quality output and uniformity of performance, while reducing miscommunication and failure to comply with industry regulations.

SUMMARY

Implementations of the present disclosure are generally directed to detecting conformance to standard operating procedures (SOPs) based on images. More particularly, implementations of the present disclosure are directed to a behavior-based SOP detection system that determines human gestures from image data (such as a series of chronological images/frames of videos) and determines conformance or non-conformance to SOPs based on the gestures.

In some implementations, actions include receiving a first set of images included in a first video captured by a camera that monitors a human performing a task; processing the first set of images using a first machine learning (ML) model to determine whether the first set of images depicts a gesture that is included in a predefined set of gestures; in response to determining that the first set of images depicts a gesture included in a predefined set of gestures, processing a second set of images included in the first video using a second ML model to determine a first gesture type of the gesture; comparing the first gesture type with a first expected gesture type to determine whether performance of the task conforms to a standard operating procedure (SOP) for the task; and providing feedback representative of a comparison result in a user interface. Other implementations of this aspect include corresponding systems, apparatus, and computer programs, configured to perform the actions of the methods, encoded on computer storage devices.

These and other implementations can each optionally include one or more of the following features, alone or in combination. In some implementations, providing the feedback on the comparison result includes: in response to determining that the first gesture type matches the first expected gesture type, displaying the first gesture type in the user interface.

In some implementations, the actions include receiving a first set of images included in a second video captured by the camera that monitors the human performing a task; in response to determining, by the first ML model, that the first set of images of the second video depicts a gesture included in the predefined set of gestures, processing a second set of images included in the second video using the second ML model to determine a second gesture type of the gesture; comparing the second gesture type with a second expected gesture type to determine whether performance of the task conforms to a standard operating procedure (SOP) for the task; and in response to determining that the second gesture type does not match the second expected gesture type, displaying alert and correction messages in the user interface.

In some implementations, a number of images in the first set of images is less than a number of images in the second set of images. In some implementations, the first ML model includes a conventional neural network (CNN), and the second ML model includes a CNN. In some implementations, the first ML model includes a residual network (ResNet), and the second ML model includes a residual network (ResNet). In some implementations, the predefined gesture set includes a set of gestures included in the SOP of the task.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Implementations of the present disclosure are generally directed to detecting conformance to standard operating procedures (SOPs) based on images, such as frames of videos. More particularly, implementations of the present disclosure are directed to a behavior-based SOP detection system that determines human gestures from image data and determines conformance or non-conformance to SOPs based on the gestures. In some implementations, a first set of images is processed by a first machine learning (ML) model to determine whether a gesture represented in the first set of images is a SOP gesture or a non-SOP gesture. If the gesture is determined to be a SOP gesture, a second set of images representative of the gesture is processed by a second ML model to determine a gesture type for the gesture. In some examples, the gesture type is compared to an expected gesture type to determine whether the gesture conforms to a SOP associated with a respective task.

In some implementations, actions include receiving a first set of images included in a first video captured by a camera that monitors a human performing a task; processing the first set of images using a first machine learning (ML) model to determine whether the first set of images depicts a gesture that is included in a predefined set of gestures; in response to determining that the first set of images depicts a gesture included in a predefined set of gestures, processing a second set of images included in the first video using a second ML model to determine a first gesture type of the gesture; comparing the first gesture type with a first expected gesture type to determine whether performance of the task conforms to a standard operating procedure (SOP) for the task; and providing feedback representative of a comparison result in a user interface.

To provide further context, and as introduced above, detecting conformance or non-conformance to standard operating procedures (SOPs) can be useful in a wide range of applications, such as product quality control. In a SOP, a human may interact with a number of objects or no objects at all. As enterprises seek efficiencies in their operations, automated systems have been developed in an effort to monitor SOPs. An example system includes object-based SOP detection. In an object-based SOP detection system, multiple ML models are specifically trained for each object involved in the SOP, and can be used to identify objects that a human is interacting with and compare these interactions with expected interactions (e.g., to determine whether the human is interacting with the correct object for a current stage of the SOP). This results in a large number of ML models to be trained and maintained (especially when the number of objects is large). In some instances, a ML model is also used to evaluate combined objects. For example, if a SOP includes a human assembling a first object with a second object, a ML model is provided for the first object, a ML model is provided for the second object, and a ML model is provided for the composite object created from assembling the first object and the second object. Furthermore, if a new object is introduced or an object is modified, a new ML model needs to be trained.

In view of the foregoing, and as introduced above, implementations of the present disclosure are directed to a behavior-based SOP detection system that determines human gestures from image data and determines conformance or non-conformance to SOPs based on the gestures. In some implementations, a first set of images is processed by a first machine learning (ML) model to determine whether a gesture represented in the first set of images is a SOP gesture or a non-SOP gesture. If the gesture is determined to be a SOP gesture, a second set of images representative of the gesture is processed by a second ML model to determine a gesture type for the gesture. In some examples, the gesture type is compared to an expected gesture type to determine whether the gesture conforms to a SOP associated with a respective task.

Figure 1:
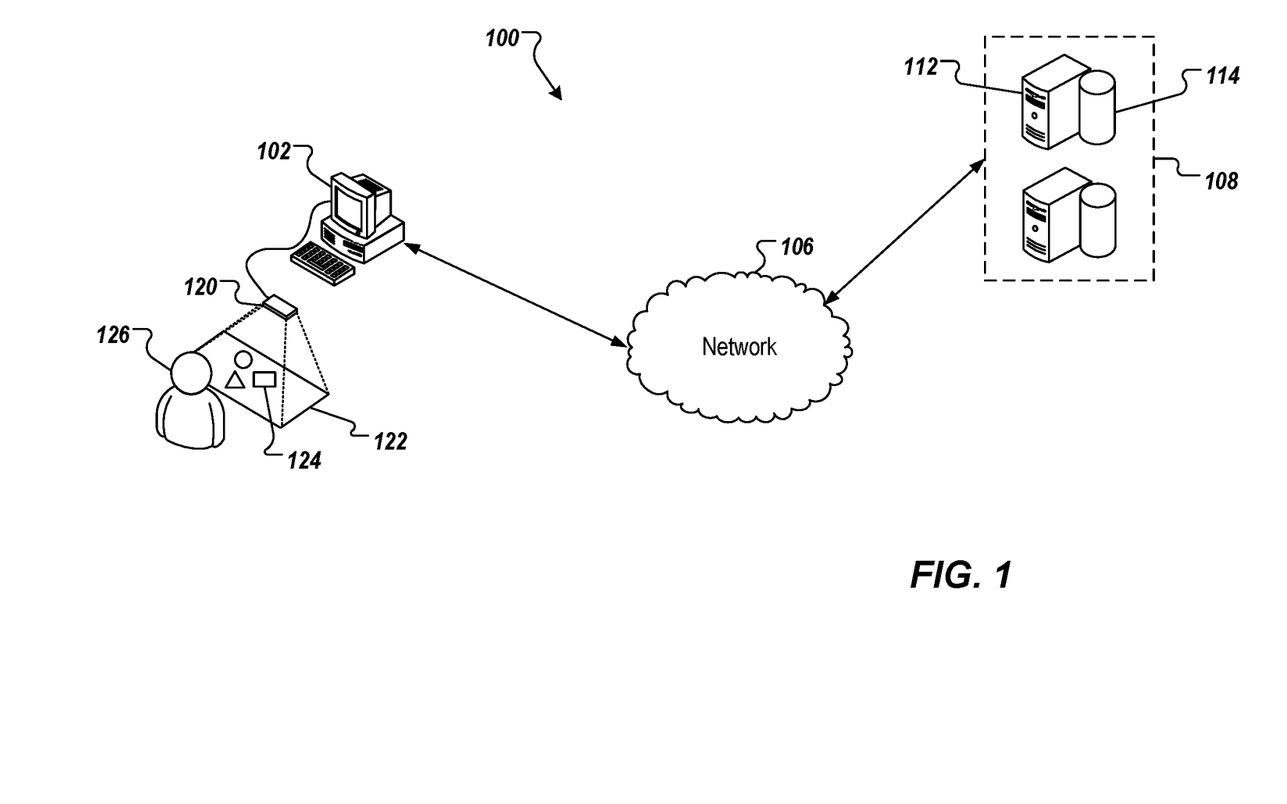
FIG. 1 depicts an example system that can execute implementations of the present disclosure.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114. In some examples, the at least one server system 112 hosts one or more computer-implemented services that users can interact with using computing devices. For example, the server system 112 can host systems for training ML models of a behavior-based SOP detection system in accordance with implementations of the present disclosure.

In the example of FIG. 1, a camera 120, a work surface 122, objects 124, and a human 126 are depicted. The camera 120 can be any appropriate type of camera (e.g., video camera) that generates images representing entities in a scene of a real-world environment. In the context of the present disclosure, the camera 120 can generate images as digital data representing movement of the human 126. The camera 120 can be installed based on a setup configuration to make sure all operations can be captured completely and clearly. For example, the setup configuration can include that the camera 120 has a wide angle, the camera is a certain distance from the work surface 122 (e.g., 70 cm above the table surface), and/or the camera is vertical towards the work surface 122.

In accordance with implementations of the present disclosure, images can be processed by a behavior-based SOP detection system to detect and selectively determine gestures of the human as represented within the images. In some examples, the behavior-based SOP detection system is executed on the computing device 102. In some examples, the behavior-based SOP detection system is executed in the back-end system 108. In some examples, gestures of the human 126 can be performed during execution of a SOP by the human 126. In some examples, the SOP includes interactions between the human and one or more of the objects 124 (e.g., assembling components). In some examples, the SOP is absent interactions between the human 126 and any object (e.g., the human 126 washing hands).

Figure 2A:
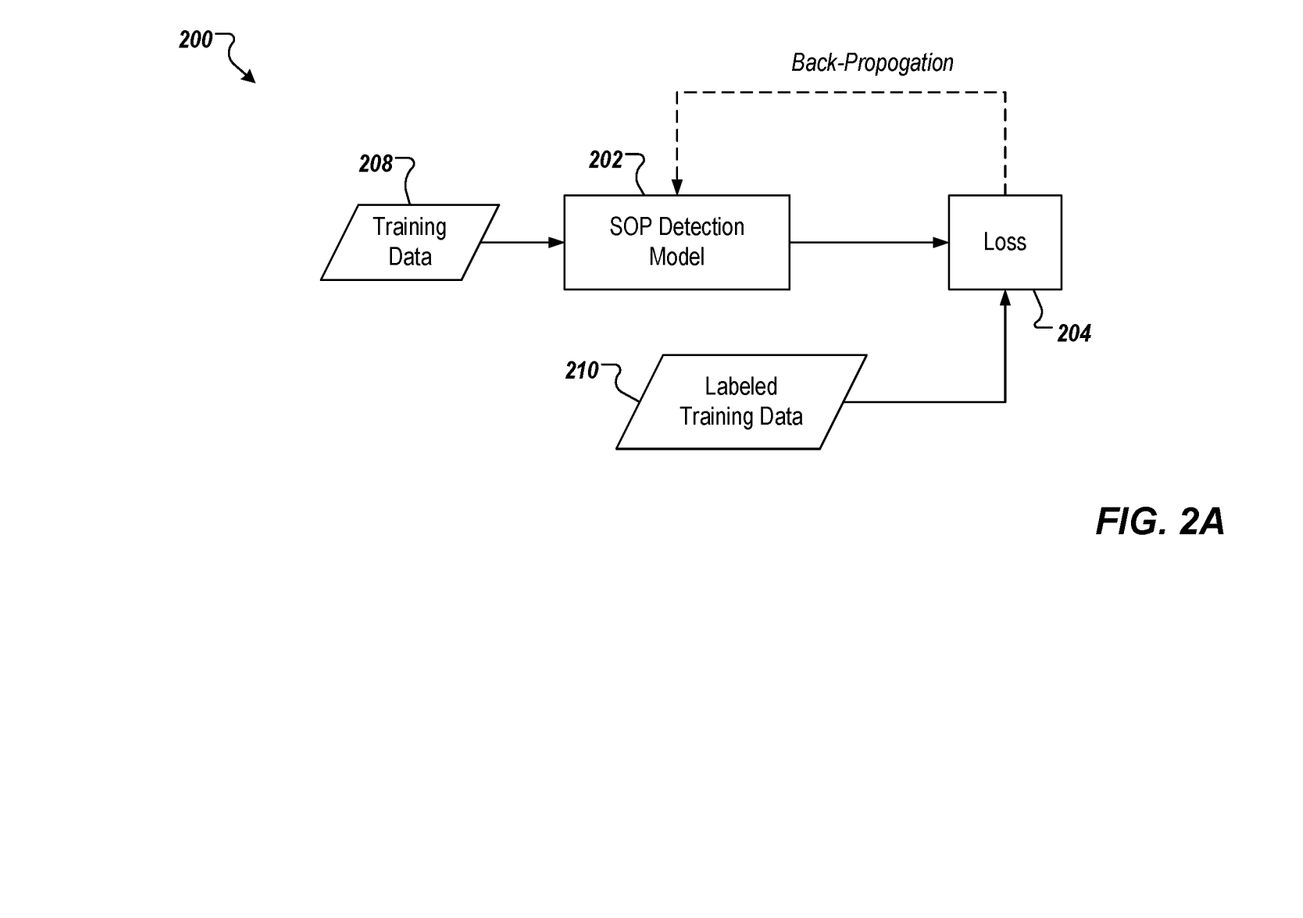
FIGS. 2A and 2B depict conceptual architectures of training phases in accordance with implementations of the present disclosure.

FIG. 2A depicts a conceptual architecture 200 of a training phase in accordance with implementations of the present disclosure. In the example of FIG. 2A, the conceptual architecture 200 of training phase includes an SOP detection model 202, a loss module 204, training data 208, and labeled training data 210. During training, the behavior-based SOP detection system can process a set of training data 208 and a set of labeled training data 210 to train the SOP detection model 202.

In further detail, during training, the behavior-based SOP detection system can receive the training data 208 as input. The behavior-based SOP detection system can process the training data 208 for SOP gesture detection. The SOP gestures can be a set of gestures or gesture types that are predefined in a SOP dictionary of operations. The set of gestures can include elemental actions that are performed in steps of a task. For example, the set of gestures can include "fetch," "hand back," "screw," and the like. The training data 208 can include images that include SOP gestures and images that do not include SOP gestures. In some examples, the training data can be frames from one or more videos that depict gestures of humans.

The SOP detection model 202 can process sub-sets of the training data 208 and generate a prediction result indicating whether a respective sub-set of training data represents a SOP gesture. In some examples, a sub-set of the training data includes two or more images that collectively represent movement of a human (e.g., movement of one or more human hands). For example, a first image can depict a human hand in a first position, a second image can depict the human hand in a second position, and a third image can depict a human hand in a third position. In some examples, the areas of hands can be segmented from the background of training data for SOP detection. The predication result can be a binary result (e.g., yes (SOP gesture) or no (non-SOP gesture)). Because the SOP detection model 202 predicts a binary result, the SOP detection model is light-weight and fast.

The behavior-based SOP detection system can compare the predicted result with the labels of the labeled training data 210, and the loss module 204 can determine a loss. Each label in the labeled training data 210 can indicate the true result (ground truth) of whether a respective sub-set of training data includes a SOP gesture. For example, a first sub-set of training data can be assigned a label of SOP gesture and a second sub-set of training data can be assigned a label of non-SOP gesture. The loss can represent a difference between the predicted result and the label (e.g., true result). The loss can be used in back propagation for iteratively training the SOP detection model 202, during which parameters of the SOP detection model 202 are iteratively adjusted. The process can be repeated until the loss satisfies a threshold (e.g., the loss is at or below a threshold loss).

Figure 2B:
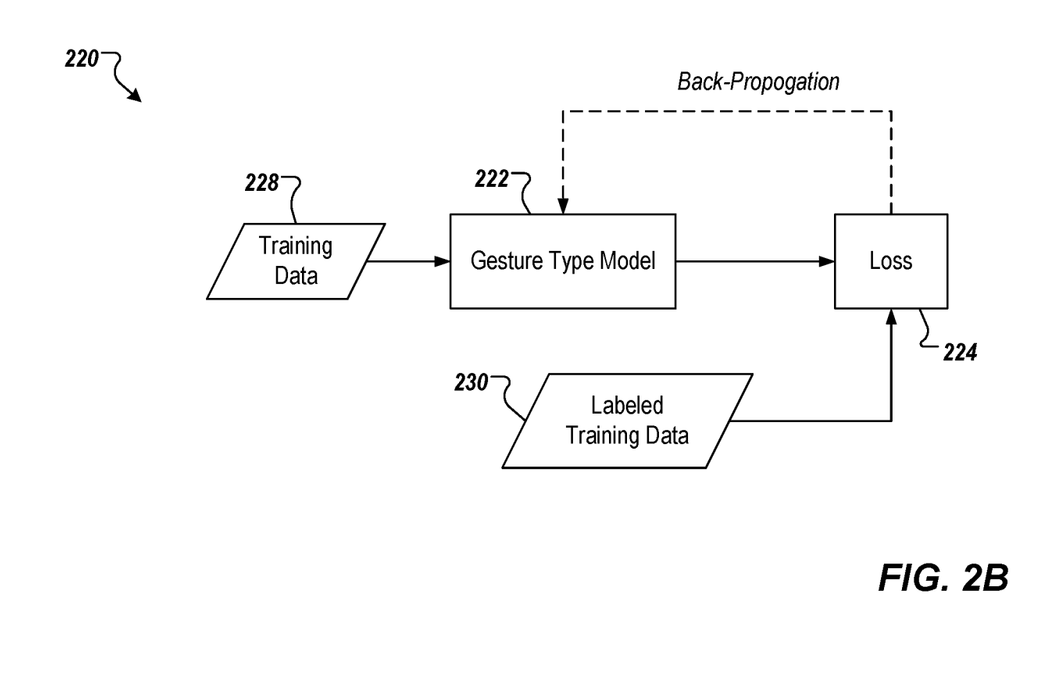

FIG. 2B depicts a conceptual architecture 220 of a training phase in accordance with implementations of the present disclosure. In the example of FIG. 2B, the conceptual architecture 220 of training phase includes a gesture type model 222, a loss module 224, training data 228, and labeled training data 230. During training, the behavior-based SOP detection system can process a set of training data 228 and a set of labeled training data 230 to train the gesture type model 222.

In further detail, during training, the behavior-based SOP detection system can receive the training data 228 as input. The behavior-based SOP detection system can process the training data 228 for gesture type detection. The SOP gestures can be a set of gestures that are predefined in an SOP dictionary of operations. The set of gestures can include elemental actions that are performed in steps of a task. For example, the set of actions can include "fetch," "hand back," "screw," and the like. The training data 228 can include images that include different types of SOP gestures. In some examples, the training data can be frames from one or more videos that depict gestures of humans.

The gesture type model 222 can process sub-sets of training data 228 and generate a prediction result indicating a gesture type that is represented in a respective sub-set of training data. In some examples, a sub-set of the training data includes multiple images that collectively represent movement of a human (e.g., movement of one or more human hands). For example, a first image can depict a human hand in a first position, a second image can depict the human hand in a second position, a third image can depict the human hand in a third position, and a fourth image can depict the human hand in a further position. In some examples, sub-sets of training data used for training the gesture type model 222 include more images than sub-sets of training data used to train the SOP detection model, discussed above. In some examples, the areas of hands can be segmented from the background of training data for gesture type detection. Example gesture types can include, for example, and without limitation, "fetch," "hand back," "screw," and the like, that are included in the SOP dictionary of operations. Because the gesture type model 222 predicts the type of the SOP gesture, the gesture type model 222 is more computationally complex and heavier than the SOP detection model 202. For example, the SOP detection model 202 can be a convolutional neural network with a relatively smaller model depth (e.g., 10). The gesture type model 222 can be a convolutional neural network with a relatively larger model depth (e.g., 101).

The behavior-based SOP detection system can compare the predicted result with the labels of the labeled training data 230, and the loss module 224 can determine a loss. Each label in the labeled training data 230 can indicate a true result (ground truth) of the gesture type represented in a respective sub-set of training data. For example, a first sub-set of training data can be assigned a first label of a first gesture type, a second sub-set of training data can be assigned a second label of a second gesture type, and so on. The loss can represent a difference between the predicted result and the label (e.g., true result). The loss can be used in back propagation for iterative training of the gesture type model 222, during which parameters of the gesture type model 222 are iteratively adjusted. The process can be repeated until the loss satisfies a threshold (e.g., the loss is at or below a threshold loss).

In general, a ML model can be iteratively trained, where, during an iteration, one or more parameters of the ML model are adjusted, and an output is generated based on the training data. For each iteration, a loss value is determined based on a loss function. The loss value represents a degree of accuracy of the output of the ML model. The loss value can be described as a representation of a degree of difference between the output of the ML model and an expected output of the ML model (the expected output being provided from training data). In some examples, if the loss value does not meet an expected value (e.g., is not equal to zero), parameters of the ML model are adjusted in another iteration of training. In some instances, this process is repeated until the loss value meets the expected value.

In some implementations, the SOP detection model 202 can be provided as a neural network and the gesture type model 222 can be provided as a neural network. For example, each of the SOP detection model 202 and the gesture type model 222 can be a respective convolutional neural network (CNN). That is, the SOP detection model 202 can be provided as a SOP detection CNN and the gesture type model 222 can be provided as a gesture type CNN. In general, a CNN can be described as an artificial intelligent (AI) algorithm that simulates the structure of human neural systems. The CNN can be applied to efficiently process image and video data. In some examples, if the input or training data is image data, the CNN can be a two-dimension (2D) CNN. If the input or the training data is video data, the CNN can be a three-dimension (3D) CNN. In some examples, each of SOP detection model 202 and the gesture type model 222 can be a respective residual network (ResNet) architecture, which can be described as a type of artificial neural network that enables one or more layers within the neural network to be skipped without affecting performance.

In some implementations, the SOP detection model 202 and the gesture type model 222 can each be provided as a respective customized (AI algorithm. In a customized AI algorithm, the length of video to process can be customized and configured, and a padding method can be used. For example, the human's hand may move too fast (e.g., speed being more than a threshold) or the movement duration may be too short (e.g., less than a threshold), the captured frames of the video corresponding to the hand movement may be limited or less than a threshold number of frames. In such cases, padding is used to duplicate some of the captured frames. As a result, the number of frames after padding can satisfy a threshold, which can be a number of frames required by the SOP detection model 202 or the gesture type model 222 to provide a respective prediction. Furthermore, to enhance the video production environment, the lighting, solarization, and contrast can be customized and configured.

Figure 2C:
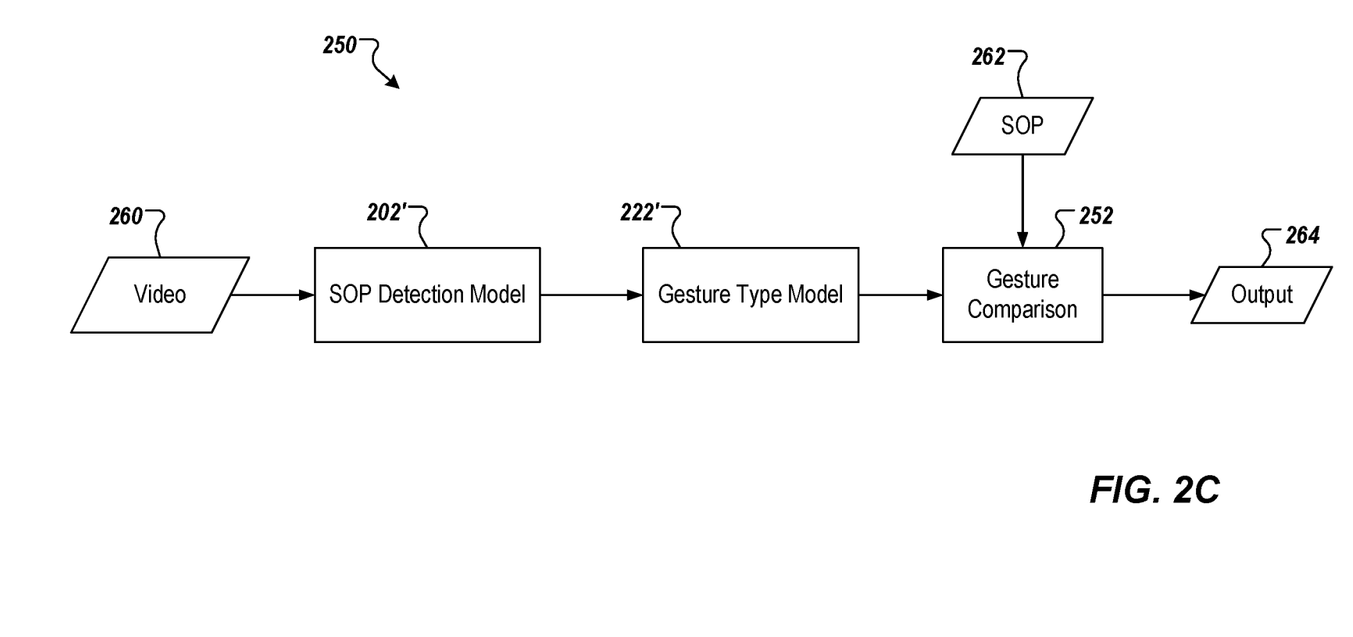
FIG. 2C depicts a conceptual architecture of an inference phase in accordance with implementations of the present disclosure.

FIG. 2C depicts a conceptual architecture of behavior-based SOP detection system 250 during an inference phase in accordance with implementations of the present disclosure. In the example of FIG. 2C, the conceptual architecture of behavior-based SOP detection system 250 includes video data 260, an SOP detection model 202', a gesture type model 222', a gesture comparison module 252, an SOP 262, and an output 264. Here, the SOP detection model 202' and the gesture type model 222' correspond to the SOP detection model 202 and the gesture type model 222, respectively, after training and deployed for inference. As described in further detail herein, the behavior-based SOP detection system 250 processes video data 260 to provide an output 264.

During the inference phase, the behavior-based SOP detection system 250 can receive the video data 260. The video data 260 can be from a video captured by a camera (e.g., the camera 120 of FIG. 1) installed in a scene of real-world environment for monitoring a human's operations for a task. The video data 260 can be processed using the SOP detection model 202'. The SOP detection model 202' can use the video data 260 as input and process the video data to obtain images (e.g., frames) from the video data 260, and further process the images. In some examples, the video data 260 includes a set of images that record movement of a human (e.g., movement of one or more human hands). The SOP detection model 202' can output a prediction indicating whether the video data 260 depicts an SOP gesture.

In accordance with implementations of the present disclosure, the SOP detection model 202' processes a first sub-set of the video data 260. For example, the first sub-set can include a first set of images (e.g., 8 images). As discussed above, the SOP detection model 202' is light-weight and generates a binary result and thus requires relatively less input data.

If the SOP detection model 202' determines that the video data 260 depicts a SOP gesture, the gesture type model 222' is triggered to determine a gesture type of the SOP gesture. The gesture type model 222' can process the video data 260 that is determined to include the SOP gesture. In accordance with implementations of the present disclosure, the gesture type model 222' processes a second sub-set of the video data 260. For example, the second sub-set can include a second set of images (e.g., 16 images). In some examples, the second set of images includes images from the first set of images, as well as images that are absent from the first set of images. The gesture type model 222' can output a gesture type for the SOP gesture included in the video data 260. As discussed above, the SOP detection model 202' is light-weight and fast. The SOP detection model 202' can run constantly (e.g., 24/7). The gesture type model 222' is more complex and heavy. The gesture type model 222' does not need to run constantly. The gesture type model 222' is triggered to process the video data 260 only if the SOP detection model 202' determines that a SOP gesture is represented in the video data 260).

By running the light-weight model constantly, and conditionally triggering the more complex and heavy gesture type model 222', the behavior-based SOP detection system 250 can run in real-time with reasonable computation cost and accurate outputs. More specifically, the behavior-based SOP detection system 250 can run in real-time as the human is performing a certain task and the camera is monitoring the human's operations. The real-time video data from the camera can be processed by the behavior-based SOP detection system 250 to detect execution of SOP gestures and, for each SOP gesture detected, the gesture type.

In further detail, the gesture type that is output from the gesture type model 222' is the actual gesture (actual gesture type) of a human that is monitored in performance of the task. The gesture comparison module 252 can compare the actual gesture to an expected gesture of the SOP 262 to determine whether there is a match. In some examples, the SOP 262 can define a series of expected gestures (expected gesture types) for a task that the human is expected to be performing. By comparing the actual gesture with the expected gesture, the behavior-based SOP detection system 250 can determine whether the human's performance of the task conforms to the SOP 262 (e.g., whether the human successfully performs the task as required by the SOP 262).

In some examples, the series of expected gestures provided in the SOP 262 defines an order that the gestures are expected to be performed in. For example, and without limitation, an example task can include assembling components and can include fetching a first component (e.g., from a first bin on a work surface), fetching a second component (e.g., from a second bin on a work surface), assembling the first component and the second component to provide an assembled component, and outputting the assembled component (e.g., to another bin, to a conveyor). In this example, the SOP 262 can include expected gestures of [fetch, fetch, assemble, output]. As another example, and without limitation, an example task can include washing hands, which can include turning on water, fetching soap, lathering hands, rinsing hands, turning off water, and drying hands. In this example, the SOP 262 can include expected gestures of [turn on, fetch, lather, rinse, turn off, dry].

In further detail, the SOP can be a set of step-by-step instructions predefined by an organization for a task to help workers carry out routine operations of the task. The SOP can include a set of operations or gestures in a certain order. For example, the SOP for assembling a product can include six steps: "fetch a rectangle part," "fetch a first screw," "turn the first screw with hand," "fetch a second screw," "turn the second screw with hand," and "put the product to a collection area."

The steps of the SOP can be categorized into a set of actions. These actions can be elemental actions that are operated repeatedly in the SOP. For example, the steps of "fetch a rectangle part," "fetch a first screw," and "fetch a second screw" are all categorized as the same elemental action "fetch." While different items are fetched in these steps, the elemental action is the same for these steps. The elemental action is also referred to as gesture or gesture type. By focusing on the elemental action or the gesture, complex SOP steps involving many different objects in the task can be categorized into a small set of gestures. Each task can correspond to a different sequence or combination of the small set of gestures.

As described herein, the behavior-based SOP detection system of the present disclosure can use the same ML for different SOPs that share the same gestures. For example, the same ML model can be used for a SOP of assembling a toy as can be used for a SOP of assembling a machine. In contrast, an object-based SOP detection system requires multiple ML models that are specifically trained for each object involved in the SOP, which results in a large number of ML models to be trained and maintained (especially when the number of objects involved in the SOP is large). Furthermore, if a new object is introduced or an object is modified, a new ML model needs to be trained in the object-based SOP detection system. Compared to the object-based SOP detection system, the behavior-based SOP detection system of the present disclosure can enable reuse of the ML model for different SOPs, reduces duplicate work, and improves resource usage efficiency and data processing efficiency.

As discussed above, the set of gestures can be predefined in SOP dictionary of operations. The set of gestures can include the elemental actions that are operated in different steps of the task.

Based on the comparison result, the behavior-based SOP detection system 250 can generate an output 264. For example, in response to determining that the actual gesture does not match the expected gesture type, the behavior-based SOP detection system 250 can provide an alert and a correction in a user interface. In this manner, the human can be alerted to the fact that they did not perform the expected gesture and what the expected gesture is that is to be performed. In response to determining that the actual gesture type matches the expected gesture type, the behavior-based SOP detection system 250 can indicate the gesture in a user interface. Accordingly, behavior-based SOP detection system 250 can determine an expected gesture type from the SOP, based on an expected current step for the task. For example, if the expected current step is "fetch a rectangle part," the behavior-based SOP detection system can determine that the expected gesture type is "fetch."

Figure 3:
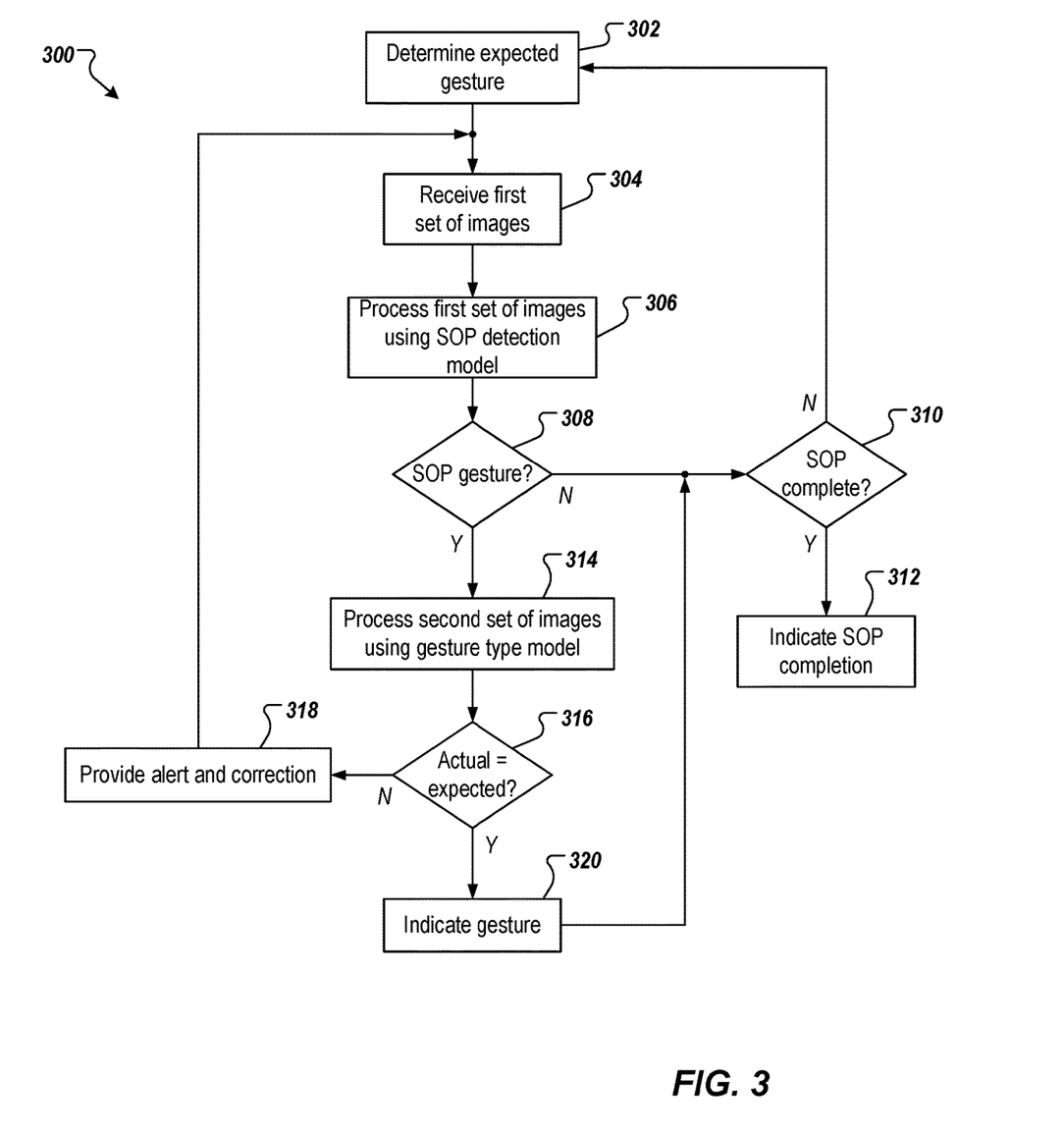
FIG. 3 depicts an example process that can be executed in accordance with implementations of the present disclosure.

FIG. 3 depicts an example process 300 that can be executed in implementations of the present disclosure. In some examples, the example process 300 is provided using one or more computer-executable programs executed by one or more computing devices. The example process 300 of FIG. 3 represents inference to determine whether a SOP is being properly executed using the behavior-based SOP detection system of the present disclosure.

An expected gesture is determined (302). For example, and as described herein, the expected gesture can be identified from an SOP (e.g., the SOP 262 of FIG. 2) that provides an order of expected gestures that are expected to be performed for a given task.

A first set of images is received (304). For example, and as described herein, the first set of images can be frames included in a video captured by a camera (e.g., the camera 120 of FIG. 1). The camera can be installed in a scene of a real-world environment and used to monitor a human's operations or interactions with one or more objects in a task. The number of images in the first set of images can be based on the duration of motion of the human.

The first set of images are processed using the SOP detection model (306). For example, and as described herein, the SOP detection model can be a trained ML model that receives the first set of images as input, processes the first set of images, and output a result indicating whether the first set of images includes an SOP gesture. The SOP gesture can be one of multiple SOP gestures included in a predefined gesture set. For example, the SOP gesture can be an SOP gesture included in the set of gestures that is predefined in the SOP dictionary of operations. The predefined gestures can include a set of gestures included in the SOP of the task.

The SOP detection model can output a result that is binary. The result can indicate whether a gesture represented in the first set of images is a SOP gesture. The SOP detection model can be a light-weight, fast model that runs constantly (e.g., 24/7).

A result indicating whether the first set of images includes an SOP gesture is output (308). For example, and as described herein, the SOP detection model can output the result. In some example, the binary result of whether there is a SOP gesture in the first set of images can be displayed in a user interface (e.g., in the top left corner of a screen of a user device) in real-time.

In response to determining that the first set of images does not include a SOP gesture, it is determined whether the SOP gesture detection is complete (310). For example, and as described herein, it is determined whether the SOP gesture detection for the last step of the task is completed. If the SOP gesture detection for the task is not complete, the process 300 loops back. If the SOP gesture detection for the task is complete, a message indicating SOP completion is displayed on a user interface (312).

In response to determining that the first set of images includes a SOP gesture, a second set of images is processed using the gesture type model (314). For example, and as described herein, the second set of images can be frames included in the video captured by a camera. The size of second set of images can be based on the duration of motion of the human. In some examples, the size of the first set of images (e.g., 8) can be smaller than the size of the second set of images (e.g., 16). As discussed herein, the gesture type model can be a trained ML model that receives the second set of images as input, processes the second set of images, and outputs a gesture type of the SOP gesture represented in the second set of images. The gesture type that is output by the gesture type model is the actual gesture performed by the human that is monitored in the current step during performance of the task.

The actual gesture is compared with the expected gesture (316). For example, and as described herein, the actual gesture type is the monitored gesture of the current step of SOP. The expected gesture type is the required gesture for the current step. By comparing the actual gesture type with the expected gesture type, the behavior-based SOP detection system can determine whether the human's operation of the current step for the task conforms to the SOP of the task. A feedback on the comparison result can be provided in a user interface in real time.

In some examples, traditional SOP detection systems detect the final state of the SOP, such as whether a product assembly is complete, whether there are missing parts. However, such detection systems focus on the assembly results, and cannot determine specifically which process was performed and/or which stage of the process caused an error. That is, the error has already occurred when it is detected. The behavior-based SOP detection system of the present disclosure can detect the performing of the task (e.g., assembly situation) in real time in accordance with a SOP, and immediately send prompts and feedback as soon as there is an abnormality, to help workers better complete their work.

In response to determining that the actual gesture type does not match the expected gesture type, the behavior-based SOP detection system can provide/display alert and correction messages in a user interface (318). For example, and as described herein, the alert can indicate that the current step of the task is not correctly performed. The correction can indicate the required specific gesture, the guidance for how to improve or how to correctly perform the current step. The alert and correction can require the human to re-perform the current step, since the human's actual operation of the current step does not conform to the SOP. The process can then proceed to step 304 to repeat the described process to determine whether the human's re-performed action for the current step matches the SOP.

The alert and correction can be provided in real time as feedback. The user interface can include various output interfaces, such as a device installed in the working environment, e.g., a speaker or a screen. The alert and correction can be output in as a voice message or a text message. In some examples, the behavior-based SOP detection system can send the alert and correction as voice messages through a speaker installed in a device associated with the user, such as the user's mobile phone. In some examples, the behavior-based SOP detection system can send the alert and correction as text messages (e.g., short message service (SMS) messages, emails, and another form of application messages) to the user device.

In response to determining that the actual gesture type matches the expected gesture type, the behavior-based SOP detection system can indicate/display the gesture type included in the video in a user interface (320). For example, and as described herein, the behavior-based SOP detection system can indicate the gesture in the user interface (e.g., in the top right corner of the screen of the user device) in real time. Since the human's actual operation of the current step conforms to the SOP, the process can then proceed to step 310 for SOP gesture detection of a next step in the task.

Implementations of the present disclosure achieve one or more technical improvements. For example, by focusing on the elemental actions or the gestures instead of the various objects involved in the SOP, implementations of the present disclosure can enable the same ML models to be reused in different SOPs, reduce duplicate work, and improve resource usage efficiency and data processing efficiency. Implementations of the present disclosure can determine human gestures from image data and determine conformance or non-conformance to SOPs based on the gestures. Implementations of the present disclosure can provide each user one-on-one attention as the user is performing a certain task and provide customized alert and correction in a user interface in real time. Implementations of the present disclosure uses two ML models in the behavior-based SOP detection system. The first ML model is light-weight and fast, while the second ML model is more complex and heavy. By running the first ML model constantly, and conditionally triggering the second model, the behavior-based SOP detection system can run in real time with a reasonable computation cost and accurate outputs.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for gesture-based standard operating procedure (SOP) detection, the method comprising:

receiving a first set of images included in a first video captured by a camera that monitors a human performing a task;

processing the first set of images of the first video using a first machine learning (ML) model to determine whether the first set of images of the first video depicts a gesture that is included in a predefined set of gestures;

in response to determining that the first set of images of the first video depicts a gesture included in a predefined set of gestures, processing a second set of images included in the first video using a second ML model to determine a first gesture type of the gesture;

comparing the first gesture type with a first expected gesture type to determine whether performance of the task conforms to a standard operating procedure (SOP) for the task; and providing feedback representative of a comparison result in a user interface, wherein a number of images in the first set of images of the first video is less than a number of images in the second set of images of the first video.

2. The method of claim 1, wherein providing the feedback on the comparison result comprises:

in response to determining that the first gesture type matches the first expected gesture type, displaying the first gesture type in the user interface.

3. The method of claim 1, further comprising:

receiving a first set of images included in a second video captured by the camera that monitors the human performing a task;

in response to determining, by the first ML model, that the first set of images of the second video depicts a gesture included in the predefined set of gestures, processing a second set of images included in the second video using the second ML model to determine a second gesture type of the gesture;

comparing the second gesture type with a second expected gesture type to determine whether performance of the task conforms to a standard operating procedure (SOP) for the task; and in response to determining that the second gesture type does not match the second expected gesture type, displaying alert and correction messages in the user interface.

4. The method of claim 1, wherein the first ML model comprises a conventional neural network (CNN), and the second ML model comprises a CNN.

5. The method of claim 4, wherein the first ML model comprises a residual network (ResNet), and the second ML model comprises a residual network (ResNet).

6. The method of claim 1, wherein the predefined gesture set comprises a set of gestures included in the SOP of the task.

7. A system, comprising:

one or more processors; and a computer-readable storage device coupled to the one or more processors and having instructions stored thereon which, when executed by the one or more processors, cause the one or more processors to perform operations for gesture-based standard operating procedure (SOP) detection, the operations comprising:

receiving a first set of images included in a first video captured by a camera that monitors a human performing a task;

processing the first set of images of the first video using a first machine learning (ML) model to determine whether the first set of images of the first video depicts a gesture that is included in a predefined set of gestures;

in response to determining that the first set of images of the first video depicts a gesture included in a predefined set of gestures, processing a second set of images included in the first video using a second ML model to determine a first gesture type of the gesture;

comparing the first gesture type with a first expected gesture type to determine whether performance of the task conforms to a standard operating procedure (SOP) for the task; and providing feedback representative of a comparison result in a user interface, wherein a number of images in the first set of images of the first video is less than a number of images in the second set of images of the first video.

8. The system of claim 7, wherein providing the feedback on the comparison result comprises:

in response to determining that the first gesture type matches the first expected gesture type, displaying the first gesture type in the user interface.

9. The system of claim 7, wherein the operations further comprise:

receiving a first set of images included in a second video captured by the camera that monitors the human performing a task;

in response to determining, by the first ML model, that the first set of images of the second video depicts a gesture included in the predefined set of gestures, processing a second set of images included in the second video using the second ML model to determine a second gesture type of the gesture;

comparing the second gesture type with a second expected gesture type to determine whether performance of the task conforms to a standard operating procedure (SOP) for the task; and in response to determining that the second gesture type does not match the second expected gesture type, displaying alert and correction messages in the user interface.

10. The system of claim 7, wherein the first ML model comprises a conventional neural network (CNN), and the second ML model comprises a CNN.

11. The system of claim 10, wherein the first ML model comprises a residual network (ResNet), and the second ML model comprises a residual network (ResNet).

12. The system of claim 7, wherein the predefined gesture set comprises a set of gestures included in the SOP of the task.

13. Computer-readable storage media coupled to one or more processors and having instructions stored thereon which, when executed by the one or more processors, cause the one or more processors to perform operations for behavior-based standard operating procedure (SOP) detection, the operations comprising:

receiving a first set of images included in a first video captured by a camera that monitors a human performing a task;

processing the first set of images of the first video using a first machine learning (ML) model to determine whether the first set of images of the first video depicts a gesture that is included in a predefined set of gestures;

in response to determining that the first set of images of the first video depicts a gesture included in a predefined set of gestures, processing a second set of images included in the first video using a second ML model to determine a first gesture type of the gesture;

comparing the first gesture type with a first expected gesture type to determine whether performance of the task conforms to a standard operating procedure (SOP) for the task; and providing feedback representative of a comparison result in a user interface, wherein a number of images in the first set of images of the first video is less than a number of images in the second set of images of the first video.

14. The computer-readable storage media of claim 13, wherein providing the feedback on the comparison result comprises:

in response to determining that the first gesture type matches the first expected gesture type, displaying the first gesture type in the user interface.

15. The computer-readable storage media of claim 13, wherein the operations further comprise:

receiving a first set of images included in a second video captured by the camera that monitors the human performing a task;

in response to determining, by the first ML model, that the first set of images of the second video depicts a gesture included in the predefined set of gestures, processing a second set of images included in the second video using the second ML model to determine a second gesture type of the gesture;

comparing the second gesture type with a second expected gesture type to determine whether performance of the task conforms to a standard operating procedure (SOP) for the task; and in response to determining that the second gesture type does not match the second expected gesture type, displaying alert and correction messages in the user interface.

16. The computer-readable storage media of claim 13, wherein the first ML model comprises a conventional neural network (CNN), and the second ML model comprises a CNN.

17. The computer-readable storage media of claim 16, wherein the first ML model comprises a residual network (ResNet), and the second ML model comprises a residual network (ResNet).

18. The computer-readable storage media of claim 13, wherein the predefined gesture set comprises a set of gestures included in the SOP of the task.

* * * * *